United States Patent Office 2,771,575
Patented Nov. 20, 1956

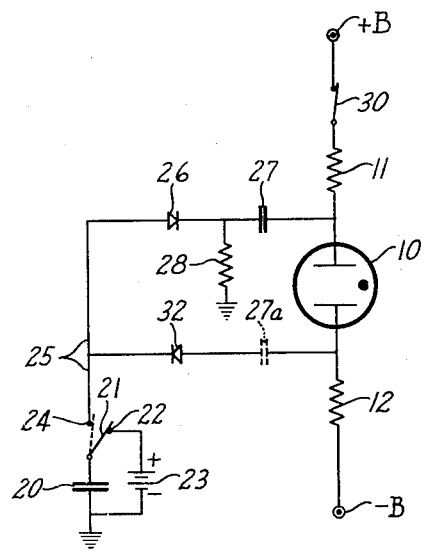
FIG_1_
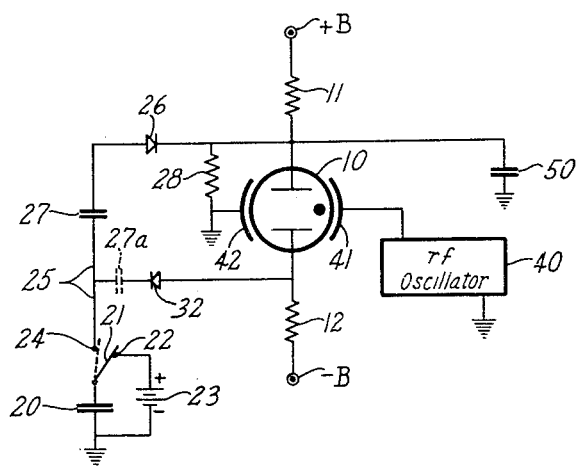
FIG_2_
INVENTOR
Robert W. Hampton

2,771,575

DIODE CAPACITOR REGENERATOR

Robert W. Hampton, Richmond Annex, Calif., assignor to Marchant Calculators, Inc., a corporation of California Application January 22, 1954, Serial No. 405,639

13 Claims. (Cl. 320—1)

The present invention relates to capacitor storage circuits, and more particularly concerns means for regenerating partially decayed capacitor charges in such circuits.

It is frequently desirable to use capacitors as a means for storing electrical charges which represent numerical or other information. The inherent leakage characteristics of capacitors, however, cause the charges so stored to gradually decay and to thereby lose their informational value.

In U. S. Patent No. 2,208,655, issued July 23, 1940, to E. P. G. Wright, there is disclosed a capacitor charge regenerating circuit which employs bulky electromechanical relays and mechanical cams that are inherently slow and noisy in operation.

In U. S. Patent No. 2,480,795, issued August 30, 1949, to J. L. Wagner, et al., a faster and quieter capacitor charge regenerator is disclosed. This circuit employs two vacuum triodes arranged to form a trigger circuit, however, and requires considerable equipment.

Another advance over the Wright circuit is disclosed in U. S. Patent No. 2,514,054, issued July 4, 1950, to F. C. Hallden. This circuit employs a single gas-filled triode for regenerating a capacitor charge, but requires the use of a mechanical commutator and is capable of regenerating only positive charges.

In the copending application Serial No. 174,867, filed July 20, 1950, by George V. Nolde, now U. S. Patent No. 2,680,808, issued June 8, 1954, there is disclosed a simplified capacitor charge regenerator comprising a thyratron having a control grid to which the decayed charge is applied thereby firing the thyratron. When the thyratron conducts, a cathode resistor increases the cathode potential, which in turn increases the control grid potential for regenerating the capacitor charge. This circuit, however, is likewise limited to the regeneration of positive charges.

The principal object of the present invention, therefore, is to employ any significant residue of a partially decayed positive or negative informational charge on a capacitor for causing restoration of the full informational charge on that capacitor.

Another and more specific object of the invention is to impress a partially decayed capacitor charge upon one electrode of a gas-filled diode to fire the diode, thereby varying the potential of the remaining electrode of the diode for recharging the capacitor to a predetermined potential level.

Other objects of the invention are:

To provide an improved capacitor charge regenerating circuit;

To provide a simplified capacitor charge regenerating circuit;

To provide a more versatile capacitor charge regenerating circuit; and

To regenerate positive or negative capacitor charges with a circuit having a diode as its sole active element.

Other objects of the invention will appear from the following description, reference being made to the accompanying drawing, in which:

Fig. 1 is a wiring diagram of a first embodiment of the invention; and

Fig. 2 is a wiring diagram of a second embodiment of the invention.

First embodiment

The first embodiment includes a normally nonconducting diode which is fired by applying a partially decayed positive capacitor charge to its anode or a similar negative charge to its cathode. When the diode conducts, its cathode potential is caused to increase and its anode potential is caused to decrease. The increased cathode potential can be employed to regenerate a positive charge on the capacitor, or the decreased anode potential can be employed to regenerate a negative charge on the capacitor.

Referring to Fig. 1, a normally nonconducting gas diode 10, which may be, for example, an Ne–2 neon diode, is provided with a discharge circuit comprising a source +B of positive potential, a normally closed interrupter switch 30, an anode resistor 11, the diode 10, a cathode resistor 12, and a source —B of negative potential. The potential difference between the sources + B and —B is sufficient to sustain conduction through tube 10, but is insufficient to initiate such conduction.

A capacitor 20, upon which a positive charge is to be regenerated, is connected between ground and a switch blade 21. When the switch blade 21 is in its solid line position, it rests against a contact 22 which is connected to the plus terminal of a battery 23, the minus terminal of which is grounded. Battery 23 represents any source of potential by which capacitor 20 may become positively charged. When it is desired to regenerate the charge on capacitor 20, switch blade 21 is thrown to its broken-line position abutting a contact 24 which is connected through a lead 25, a rectifier 26 and a capacitor 27 to the anode of tube 10. A bleeder resistor 28 is connected to ground from a junction between rectifier 26 and capacitor 27. The cathode of tube 10 is connected to lead 25 through a rectifier 32. Rectifiers 27 and 32 may be, for example, germanium diodes. The back resistance of rectifier 32, in series with resistor 12 constitutes a bleeder path similar to that provided by resistor 28.

If a positive charge is stored on capacitor 20, and switch blade 21 is moved to its broken-line position, a positive pulse is passed through rectifier 26 and capacitor 27 to the anode of tube 10, raising the anode potential of the tube. If the charge on capacitor 20 is more than a predetermined minimum level, the anode potential of tube 10 is raised sufficiently to cause the tube to conduct. Rectifier 32 prevents the positive pulse from being applied to the cathode of tube 10. When the tube is fired, its cathode potential rises due to the voltage drop across resistor 12. The increase in cathode potential causes (conventional) current to flow through rectifier 32, lead 25, contact 24, and switch blade 21 to regenerate the charge on capacitor 20 to a level which is predetermined by the values of +B, —B, and resistors 11 and 12.

Following the regeneration of the charge on capacitor 20, the previously mentioned interrupter switch 30 may be opened by any appropriate means, thereby interrupting the discharge circuit of tube 10 to extinguish that tube and prepare the circuit for a subsequent regeneration operation.

In the circuit shown in Fig. 1, it will be seen that when switch blade 21 is closed to its broken-line position, a circuit is completed from capacitor 20 through switch blade 21, contact 24, lead 25, rectifier 26 and the bleeder resistor 28 to ground, thereby establishing a leakage path for the charge on capacitor 20. Therefore, when the charge on capacitor 20 is regenerated, tube 10 must remain conducting until switch blade 21 is removed from contact 24, i. e., the discharge interrupter switch 30 cannot be opened until after capacitor 20 is disconnected from its leakage path. Means will be described, in relation to the second embodiment of the invention, for eliminating the above described leakage path for capacitor 20 to thereby provide greater flexibility in the timing of the operation of switch blade 21.

With minor changes, the circuit shown in Fig. 1 can also be made to regenerate negative charges on capacitor 20. For this purpose, capacitor 27 is removed from the position in which it is shown in Fig. 1, and that capacitor is interposed between rectifier 32 and the cathode of tube 10, where the capacitor is shown in broken lines as 27a; also, the terminals of battery 23 are reverse so that capacitor 20 is charged negatively. With the circuit thus altered, a negative charge on capacitor 20 is regenerated in the following manner.

When switch blade 21 is closed to its broken-line position abutting contact 24, the negative charge on capacitor 20 causes a negative pulse to be conducted through the switch blade 21, contact 24, lead 25, rectifier 32, and capacitor 27a to the cathode of tube 10. If the negative charge on capacitor 20 is of sufficient magnitude, the cathode potential of tube 10 is decreased sufficiently to fire that tube. The negative pulse from capacitor 20 is prevented by rectifier 26 from reaching the anode of tube 10. When the tube is fired, its anode potential decreases due to the drop across resistor 11, so that (electron) current flows through rectifier 26, lead 25 and switch blade 21 to capacitor 20, thereby regenerating the negative charge on that capacitor to a predetermined level, the value of which depends upon the values of +B, —B, and resistors 11 and 12.

Second embodiment

A second embodiment of the capacitor regenerator is similar to the first except that additional means are shown for (1) stabilizing the operation of the diode, and (2) automatically extinguishing the diode. Like parts of the two embodiments are identically numbered.

Referring to Fig. 2, the reliability of operation of tube 10 may be improved by stabilizing the gas ionization within that tube by means of an externally applied R. F. field, in the manner disclosed in U. S. Patent No. 2,604,589, issued July 22, 1952, to Meryl C. Burns. For this purpose an R. F. oscillator 40 is connected to and energizes a first external electrode 41. A second external electrode 42 cooperates with electrode 41, thereby completing an R. F. circuit to ground. The stabilizing effect of the R. F. circuit upon the operation of a gas tube is fully described in the above-named patent.

In the circuit shown in Fig. 2, there is no interrupter switch corresponding to switch 30 in Fig. 1. Instead, means are provided for automatically extinguishing tube 10 each time it is fired. A capacitor 50 is connected between the anode of tube 10 and ground and is normally charged to +B potential through the anode resistor 11. When tube 10 is fired, capacitor 50 is discharged through the tube, thereby extinguishing the tube by lowering its anode potential. The values of resistor 11 and capacitor 50 are chosen such that the gas within tube 10 has time to completely deionize before capacitor 50 becomes recharged to a potential which would sustain conduction through the tube. Therefore, the tube remains extinguished until it is refired by a subsequently applied charge from capacitor 20.

It will be recalled that in the circuit shown in Fig. 1, when switch blade 21 is closed to its solid-line position, a circuit is completed from capacitor 20 through switch blade 21, contact 24, lead 25, rectifier 26 and the bleeder resistor 28 to ground, presenting a leakage path for the charge on capacitor 20. Therefore, when the charge on capacitor 20 is regenerated, tube 10 must remain conducting until switch blade 21 is removed from contact 24, i. e., the discharge interrupter switch 30 cannot be opened until after capacitor 20 is disconnected from its leakage path. In the circuit shown in Fig. 2, however, the extinguishing of tube 10 has been shown to be automatic; therefore, either the switch blade 21 must be moved away from contact 24 before tube 10 is extinguished, or the leakage path for capacitor 20 must be eliminated. This leakage path may be eliminated by moving capacitor 27 to a position between capacitor 20 and resistor 28, as shown in Fig. 2, so that no D. C. circuit is completed to ground from the high potential side of capacitor 20. For regenerating negative charges, the capacitor 27 may be moved to a position between capacitor 20 and rectifier 32, as shown at 27a in Fig. 2.

I claim:

1. A capacitor positive charge regenerator comprising: a precharged capacitor; a normally nonconducting gas-filled diode having an anode and a cathode; means for establishing a pulse circuit from the capacitor to the anode of said diode for causing conduction of the latter if at least a predetermined minimum positive charge resides on said capacitor; means for raising the cathode potential of said diode in response to said conduction; and means for establishing a D. C. circuit from the cathode of said diode to the capacitor for regenerating the charge on the capacitor in response to the raised cathode potential.

2. A capacitor negative charge regenerator comprising: a precharged capacitor; a normally nonconducting gas-filled diode having an anode and a cathode; means for establishing a pulse circuit from the capacitor to the cathode of said diode for causing conduction of the latter if at least a predetermined minimum absolute value of negative charge resides on said capacitor; means for lowering the anode potential of said diode in response to said conduction; and means for establishing a D. C. circuit from the anode of said diode to the capacitor for regenerating the charge on the capacitor in response to the lowered anode potential.

3. A capacitor charge regenerator comprising: a precharged capacitor; a normally nonconducting gas-filled diode having first and second electrodes; means for establishing a pulse circuit from the capacitor to said first electrode for causing conduction of said diode if at least a predetermined minimum absolute value of charge resides on said capacitor; means for changing the potential of said second electrode in response to said conduction; and means for establishing a D. C. circuit from said second electrode to the capacitor for regenerating the charge on the capacitor in response to said change of potential.

4. A circuit for regenerating positive capacitor charges, said circuit comprising: a normally nonconducting gas-filled diode having a cathode and an anode; a source of high potential; an anode resistor connecting said anode to the source of high potential; a source of low potential; a cathode resistor connecting said cathode to the source of low potential; a precharged capacitor having a high potential side and a low potential side; a source of reference potential; means connecting the low potential side of said capacitor to said source of reference potential; a normally open switching means having a first side of a second side; means connecting the first side of said switching means to the high potential side of said capacitor; a first rectifier connecting the second side of said switching means to said cathode, the orientation of said first rectifier being such that the latter conducts conventional current only toward said switching means; a second rectifier connected to the second side of said switching means, the orientation of said second rectifier being such that the latter conducts conventional current only away from said switching means; a capacitive connection from the second rectifier to said anode; and means for closing said switching means.

5. A circuit for regenerating negative capacitor charges, said circuit comprising: a normally nonconducting gas-filled diode having a cathode and an anode; a source of high potential; an anode resistor connecting said anode to the source of high potential; a source of low potential; a cathode resistor connecting said cathode to the source of low potential; a precharged capacitor having a high potential side and a low potential side; a source of reference potential; means connecting the high potential side of said capacitor to said source of reference potential; a normally open switching means having a first side and a second side; means connecting the first side of said switching means to the low potential side of said capacitor; a first rectifier connecting the second side of said switching means to said anode, the orientation of said first rectifier being such that the latter conducts conventional current only toward said anode; a second rectifier connected to the second side of said switching means, the orientation of said second rectifier being such that the latter conducts conventional current only toward said switching means; a capacitive connection from the second rectifier to said cathode; and means for closing said switching means.

6. A circuit for regenerating positive capacitor charges, said circuit comprising: a normally nonconducting gas-filled diode having a cathode and an anode; a source of high potential; an anode resistor connecting said anode to the source of high potential; a source of low potential; a cathode resistor connecting said cathode to the source of low potential; a source of reference potential; a precharged capacitor having a high potential side and a low potential side; means connecting the low potential side of said capacitor to said source of reference potential; a normally open switching means having a first side and a second side; means connecting the first side of said switching means to the high potential side of said capacitor; a first rectifier connecting the second side of said switching means to said cathode, the orientation of said first rectifier being such that the latter conducts conventional current only toward said switching means; a second rectifier connected to said anode, the orientation of said second rectifier being such that the latter conducts conventional current only toward said anode; a capacitive connection from the second rectifier to the second side of said switching means; and means for closing said switching means.

7. A circuit for regenerating negative capacitor charges, said circuit comprising: a normally nonconducting gas-filled diode having a cathode and an anode; a source of high potential; an anode resistor connecting said anode to the source of high potential; a source of low potential; a cathode resistor connecting said cathode to the source of low potential; a source of reference potential; a precharged capacitor having a high potential side and a low potential side; means connecting the high potential side of said capacitor to said source of reference potential; a normally open switching means having a first side and a second side; means connecting the first side of said switching means to the low potential side of said capacitor; a first rectifier connecting the second side of said switching means to said anode, the orientation of said first rectifier being such that the latter conducts conventional current only toward said anode; a second rectifier connected to said cathode, the orientation of said second rectifier being such that the latter conducts conventional current only away from said cathode; a capacitive connection from the second rectifier to the second side of said switching means; and means for closing said switching means.

8. A circuit for regenerating positive capacitor charges, said circuit comprising: a normally nonconducting diode having a cathode and an anode; a source of reference potential; a precharged capacitor having a high potential side and a low potential side; means connecting the low potential side of the capacitor to said source of reference potential; a first unidirectionally conducting circuit for connecting the high potential side of the capacitor to said anode to cause said diode to conduct if at least a predetermined minimum positive charge resides on said capacitor; means operable in response to said conduction for increasing the potential of said cathode; and a second unidirectionally conducting circuit for connecting said cathode to the high potential side of said capacitor for regenerating the charge on said capacitor in response to said increase in cathode potential.

9. A circuit for regenerating negative capacitor charges, said circuit comprising: a diode normally in a nonconducting state having a cathode and an anode; a source of reference potential; a precharged capacitor having a high potential side and a low potential side; means connecting the high potential side of the capacitor to said source of reference potential; a first unidirectionally conducting circuit for connecting the low potential side of the capacitor to said cathode to cause said diode to conduct if at least a predetermined minimum absolute value of negative charge resides on said capacitor; means operable in response to said conduction for decreasing the potential of said anode; and a second unidirectionally conducting circuit for connecting said anode to the low potential side of said capacitor for regenerating the charge on said capacitor in response to said decrease in anode potential.

10. A circuit for regenerating capacitor charges, said circuit comprising: a normally nonconducting diode having a first electrode and a second electrode; a source of reference potential; a precharged capacitor having a first side and a second side; means connecting the first side of the capacitor to said source of reference potential; a first unidirectionally conducting circuit for connecting the second side of the capacitor to said first electrode to cause said diode to conduct if at least a predetermined minimum absolute value of charge resides on said capacitor; means operable in response to said conduction for changing the potential of said second electrode; and a second unidirectionally conducting circuit for connecting said second electrode to the second side of said capacitor for regenerating the charge on said capacitor in response to said change in potential of said second electrode.

11. A circuit for regenerating positive capacitor charges, said circuit comprising: a normally nonconducting diode having a cathode and an anode; a source of reference potential; a precharged capacitor having a high potential side and a low potential side; means connecting the low potential side of the capacitor to said source of reference potential; a first unidirectionally conducting circuit for connecting the high potential side of the capacitor to said anode to cause said diode to conduct if at least a predetermined minimum positive charge resides on said capacitor; means operable in response to said conduction for increasing the potential of said cathode; a second unidirectionally conducting circuit for connecting said cathode to the high potential side of said capacitor for regenerating the charge on said capacitor in response to said increase in cathode potential; and means operable in response to said conduction for terminating said conduction.

12. A circuit for regenerating negative capacitor charges, said circuit comprising: a diode normally in a nonconducting state and having a cathode and an anode; a source of reference potential; a precharged capacitor having a high potential side and a low potential side; means connecting the high potential side of the capacitor to said source of reference potential; a first unidirectionally conducting circuit for connecting a low potential side of the capacitor to said cathode to cause said diode to conduct if at least a predetermined minimum absolute value of negative charge resides on said capacitor; means operable in response to said conduction for decreasing the potential of said anode; a second unidirectionally conducting circuit for connecting said anode to the low potential side of said capacitor for regenerating the charge on said capacitor in response to said decrease in anode potential; and means operable subsequent to said conduction for causing said diode to resume its nonconducting state.

13. A circuit for regenerating capacitor charges, said circuit comprising: a normally nonconducting diode having a first electrode and a second electrode; a source of reference potential; a precharged capacitor having a first side and a second side; means connecting the first side of the capacitor to said source of reference potential; a first unidirectionally conducting circuit for connecting the second side of the capacitor to said first electrode to cause said diode to conduct if at least a predetermined minimum absolute value of charge resides on said capacitor; means operable in response to said conduction for changing the potential of said second electrode; a second unidirectionally conducting circuit for connecting said second electrode to the second side of said capacitor for regenerating the charge on said capacitor in response to said change in potential of said second electrode; and means operable subsequent to said conduction for causing said diode to terminate said conduction.

References Cited in the file of this patent

UNITED STATES PATENTS

| | | |
|---|---|---|
| 2,208,655 | Wright | July 23, 1940 |
| 2,480,795 | Wagner | Aug. 30, 1949 |
| 2,495,301 | Wengel | Jan. 24, 1950 |
| 2,514,054 | Hallden | July 4, 1950 |
| 2,546,799 | Thatcher | Mar. 27, 1951 |
| 2,604,589 | Burns | July 22, 1952 |
| 2,619,514 | Stanton | Nov. 25, 1952 |
| 2,680,808 | Nolde | July 8, 1954 |